May 4, 1965 G. J. SIEZEN 3,182,135

APPARATUS FOR CHECKING IMPERFECTIONS IN A RECORDING MEDIUM

Filed April 2, 1962

INVENTOR
GERRIT J. SIEZEN.
BY
AGENT 3,182,135

APPARATUS FOR CHECKING IMPERFECTIONS IN A RECORDING MEDIUM

Gerrit Jan Siezen, Baarn, Netherlands, assignor to North American Philips Company, Inc., New York, N.Y., a corporation of Delaware Filed Apr. 2, 1962, Ser. No. 184,246
Claims priority, application Netherlands, Apr. 4, 1961, 263,173
3 Claims. (Cl. 179—100.1)

In systems for the transmission or reproduction of information, it is usual to record this information on a suitable recording medium and to check the record for interference before it is transmitted or reproduced.

The form of recording and the details of the method of checking will in general be different for different systems.

For example, in transmission systems in which the information is transmitted by means of sequences of information digits, generally in binary code, at the end of each information sequence a checking sequence is recorded which corresponds to the information sequence and which indicates, for example, the sum of the information digits when they have been recorded correctly. If an error is detected, the sequence concerned is not transmitted, but is recorded again.

When the information consists of acoustic oscillations which are recorded on a die from which a considerable number of phonograph records are to be manufactured, the sound track in this die is checked to detect the presence of any interfering imperfections of the groove wall. For carrying out this checking process, it is known to use a device in which such imperfections are recorded with the aid of a reading head, but this is only effective when the acoustic signal recorded at the place concerned in the sound track is not strong enough to drown the "ticking" or "spattering" caused by the imperfection. In another device of this kind, the discriminating effect is achieved by using two scanning needles, one for the acoustic signal and one for the interference signal, each needle scanning the grooves in a different manner.

Both of these checking systems exhibit certain disadvantages. In the first one, the recording of each checking sequence requires a period of time which constitutes a considerable part (generally 30%) of the time required for the associated useful information. In the second system, a certain groove length as a distance between the two needles is inevitable, so that use must be made of a delaying device for the correct comparison of the signals read by these needles.

According to the invention, a simple and effective checking means is provided for use in transmission systems which are identical or similar to the systems described above. The checking means according to the invention is different in principle from those mentioned above and consists in part in the following: in recording information consisting of electric signals which are to be transmitted or reproduced, a frequency band lying within the frequency range of these signals is suppressed; the suppressed frequency band is so narrow that its suppression can hardly be detected when the record is reproduced.

The invention is based on the recognition that any disturbing imperfections in the record within the suppressed small frequency band, which can readily be separated during the checking process by means of filters, can be satisfactorily detected under the control of the remaining part of the recorded signals lying outside these filters. The use of the invention renders unnecessary the recording of time-consuming checking sequences in systems of the kind mentioned above; for checking dies for phonograph records a reading head with only one needle is sufficient when using the invention.

The acoustic oscillations which must be recorded in the sound grooves of phonograph records, which are to be manufactured in large numbers, are generally first recorded on a magnetic tape and then transferred onto a lacquer plate. According to the invention, during this transfer an extremely narrow frequency band, for example 200 c./s., lying at a preferably high frequency of, for example, 5000 c./s., is drastically suppressed, for example by 60 db. With the aid of auxiliary positives mostly consisting of metal, the records are manufactured from this lacquer plate. If the lacquer plate is free of imperfections of the groove wall then, when this record or a positive manufactured therefrom is played with a pick-up, the output signal of which is passed through an amplifier sharply tuned to the narrow frequency band, the output signal of the amplifier will be substantially zero.

However, if there are local imperfections of the groove wall, new spectral components are introduced at these places and the said selectively tuned amplifier will supply a signal each time when the pick-up passes such an imperfection, the amplitude of this signal being approximately proportional both to the amplitude and to the extent of the imperfection of the groove wall, the latter viewed in the direction of the groove.

The invention will be more fully understood from the following description and accompanying drawing, wherein:

FIG. 1 represents the acoustic signal in the form in which it is recorded in the lacquer plate when use is made of the invention. As shown in FIG. 1 by way of example, a narrow band $f_1$–$f_2$ having a width of approximately 200 c./s. is substantially completely suppressed at the frequency of 5000 c./s.

Figure 3:
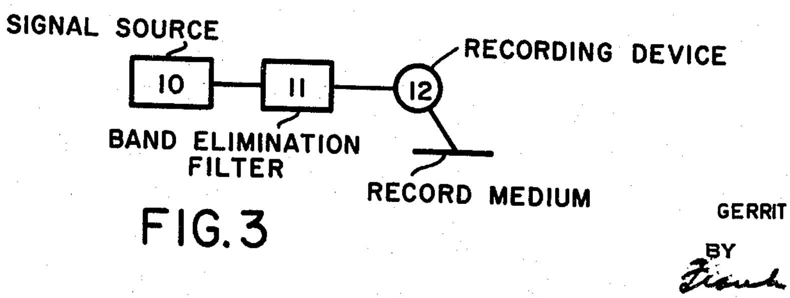
FIG. 3 is a functional block diagram of a circuit used in recording the signal.

FIG. 3 shows one manner in which the recording may be done. As shown therein, reference numeral 10 denotes generally a signal source 10, the signal from which is fed to a band-elimination filter 11 designed to suppress the narrow frequency band. Subsequently the signal with a suppressed band is recorded on the record medium by means of recording device 12.

Figure 1:
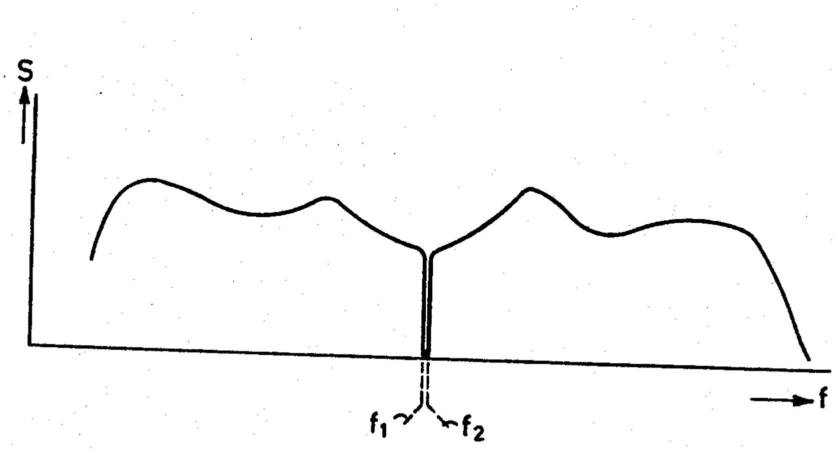
FIG. 1 is a graph of an acoustic signal when modified in accordance with the invention.
Figure 2:
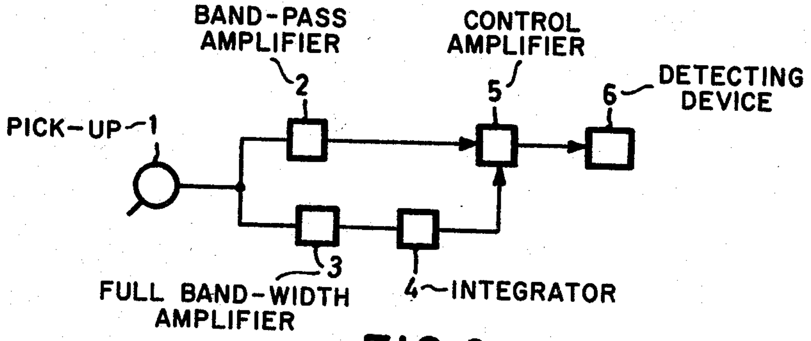
FIG. 2 is a functional block diagram of a circuit used with the invention.

In order to check the presence of any imperfections of the groove wall, the lacquer plate itself, if desired after being metallized, or an auxiliary positive manufactured from this plate, is played with the aid of the circuit shown diagrammatically in FIG. 2.

The pick-up 1, which may be of the conventional type, is connected through a sharply selective amplifier 2 which passes substantially only frequencies between $f_1$ and $f_2$, and through a control amplifier 5, whose function will be given below, to a device 6 on which permanent or semi-permanent indications are made by pulses which may be supplied by the amplifier 2 and passed by the control amplifier 5.

The purpose of the control amplifier 5 is to render the recording of the imperfections dependent upon the ratio between the extent of the imperfection and the speech or music level at the place of that imperfection. For this purpose, the output voltage of the pick-up 1 is amplified with full band-width through an amplifier 3 and converted by an integrator 4 into a control voltage for the amplifier 5; the control voltage reduces the amplifying factor of control amplifier 5 in accordance with the increase in the amplitude of the signal supplied by the pick-up. When the latter signal has an amplitude which is sufficient to drown the sound caused by the imperfection of the groove wall, the control amplifier is substantially cut off.

While the invention has been described for a single embodiment, various changes and modifications thereof will be apparent to those skilled in the art without departing from the inventive concept, the scope of which is set forth in the appended claims.

What is claimed is:

1. Apparatus for detecting imperfections in a recording medium, comprising: means for recording on said medium a signal having a relatively wide frequency range from which a relatively narrow frequency band is substantially suppressed, the extent of said narrow band being such that its absence is substantially inaudible when reproduced, reproducing means for reproducing said signal, the reproduced signal being applied to a band-pass filter tuned to said narrow frequency band, and means for applying the signal band passed by said filter to a detecting device to detect the presence of imperfections in the recording medium lying in said narrow frequency band.

2. Apparatus for detecting imperfections in a recording medium, comprising: means for recording on said medium a signal having a relatively wide frequency range from which a relatively narrow frequency band is substantially suppressed, the extent of said narrow band being such that its absence is substantially inaudible when reproduced, reproducing means for reproducing said signal, the reproduced signal being applied to a band-pass filter tuned to said narrow frequency band, the output of said band-pass filter being applied to a control amplifier, means coupled to said control amplifier for varying the amplification factor of said control amplifier responsive to the amplitude of the signals from said reproducing means, and means for applying the signal band passed by said filter to a detecting device to detect the presence of imperfections in the recording medium lying in said narrow frequency band.

3. Apparatus for detecting imperfections in a recording medium, comprising: means for recording on said medium a signal having a relatively wide frequency range from which a relatively narrow frequency band is substantially suppressed, the extent of said narrow band being such that its absence is substantially inaudible when reproduced, reproducing means for reproducing said signal, the reproduced signal being applied to a band-pass filter tuned to said narrow frequency band and to a full bandwidth amplifier, the output of said band-pass filter being applied to a control amplifier, integrating means coupled to the output of said full band-width amplifier, the output of said integrating means being applied to said control amplifier to vary the amplification factor thereof, and means for applying the signal band passed by said filter to a detecting device to detect the presence of imperfections in the recording medium lying in said narrow frequency band.

References Cited by the Examiner

UNITED STATES PATENTS 1,989,965 8/31 Beverage ----------- 179—100.3

IRVING L. SRAGOW, *Primary Examiner.*

BERNARD KONICK, *Examiner.*